UNITED STATES PATENT OFFICE.

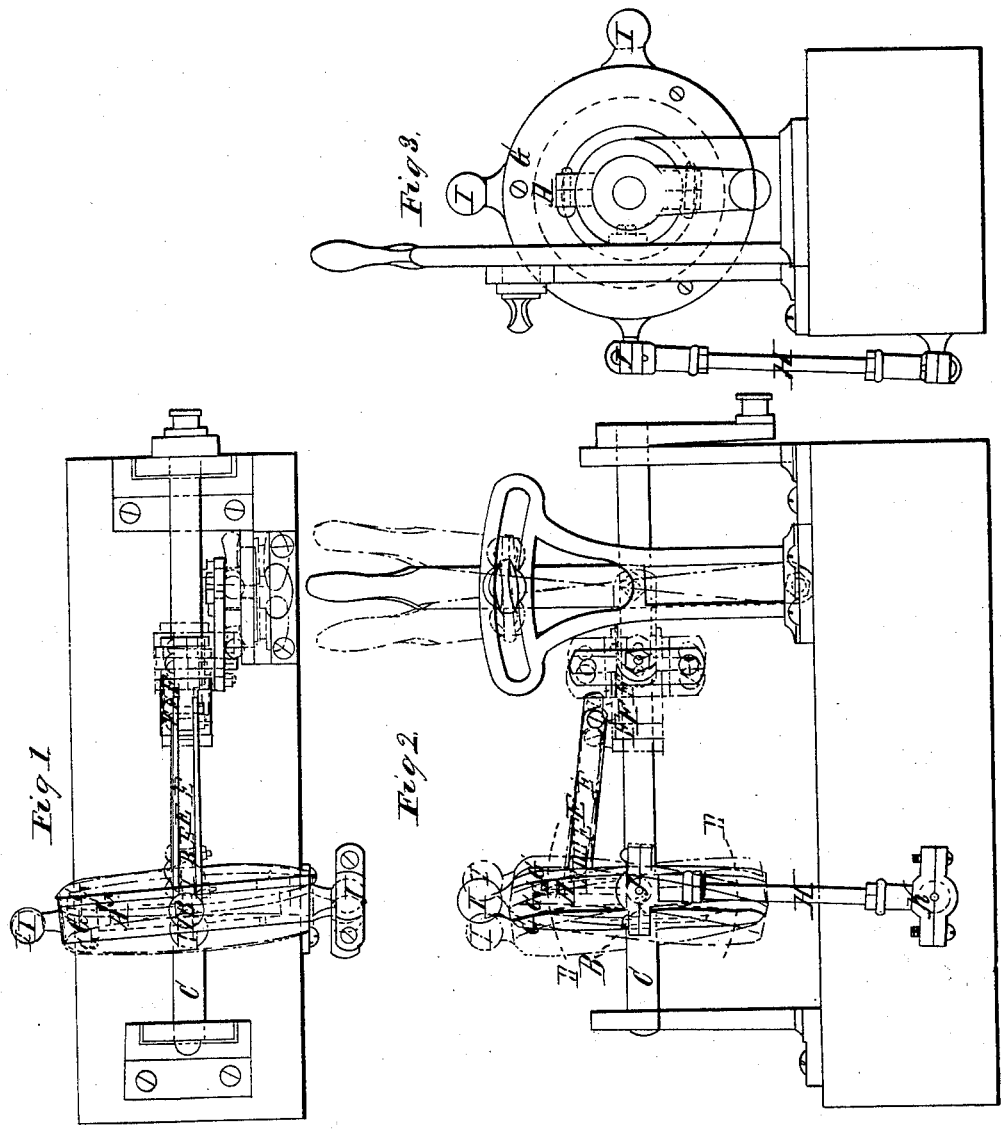
S. L. Wiegand,
Mechanical Movement.
N⁰ 20,384.                              Patented May 25, 1858.

S. L. WIEGAND, OF PHILADELPHIA, PENNSYLVANIA.

CHANGING ROTARY INTO RECIPROCATING MOTION.

Specification of Letters Patent No. 20,384, dated May 25, 1858.

*To all whom it may concern:*

Be it known that I, S. LLOYD WIEGAND, of Philadelphia, in the county of Philadelphia, in the State of Pennsylvania, have invented a new and Improved Device for Changing a Rotary Motion Into a Reciprocating Motion for Operating the Valves of Steam-Engines and other Purposes; and I do hereby declare that the following is a full and exact description thereof, reference being made to the accompanying drawings and to the letters of reference marked thereon.

The nature of my invention consists in a wheel placed upon the main shaft of a steam engine or upon an auxiliary shaft in such a manner that while it revolves with the shaft it can be rendered oblique to the axis of said shaft and the extent of such obliquity or inclination may be adjusted without interfering with the rotation of the shaft or wheel.

In the accompanying drawing A represents a wheel placed upon the shaft C and attached to said shaft by means of a bolt B transverse to the shaft C, on which bolt B, A can be vibrated in the direction of the arcs D, D, dotted in red line in Figure 2, by means of a link E connecting it with a sliding collar F, which collar is operated by any known means in the direction of the axis of the shaft. Vibratory motion is conveyed from the periphery of the wheel by means of a frame G which is free to vibrate with the wheel, but is confined by means of the link H in such a manner as to prevent it from revolving with the wheel. Rods for conveying the motion thus produced are connected with the frame by means of the ball and socket joints I, I or by a universal joint in such a manner that the vibratory motion of the frame G is imparted to the rods.

To enable an expert to construct the same the following is a sufficient description: A wheel A is placed upon the shaft C and secured to the shaft by means of a pin or bolt B passing through the shaft C transversely, which shaft C is bored for that purpose. Fitting around the wheel A in such a manner as to permit the wheel to revolve in it is an annular frame G which for convenience of fitting can be constructed of two parts G and G' secured to each other by means of screws. Rigidly attached to the frame G is a ball and socket joint J which is held by a link H attached at its other extremity K to some fixed portion of the machine in such a manner that it will permit the frame G to vibrate laterally but not to rotate with the wheel A. Firmly attached to the frame G are ball and socket joints I, I which communicate the vibratory motion of the frame C to the rods. Upon the shaft C is a loose sliding collar F which is connected by means of a link E to the revolving wheel A in such a manner that the sliding of the collar F causes the angle formed by the plane of the wheel A to the axis of the shaft C to be varied, whereby the extent of the vibratory motion imparted to the frame G can be varied and adjusted. When a sliding valve is to be operated which has lips overlapping the steam openings so that it requires a "lead" in its motion to cause the steam openings to be uncovered promptly at the commencement of each stroke of the piston it is then requisite to have the wheel attached to the shaft with a permanent obliquity in the direction of the bolt B by which it is secured to the shaft A in Fig. 1.

Fig. 1 exhibits a plan of the arrangement attached to the shaft. Fig. 2 exhibits an elevation of the same. Fig. 3 exhibits an end view of the same.

The same letters refer to the same parts in the several figures.

The red and blue drawings on Figs. 1 and 2 exhibit the changes of obliquity of which the apparatus is susceptible, the same letters referring to the same parts as in the black drawing.

What I specify as the essential feature of my invention is the use of an oblique wheel to change a rotary into a reciprocating motion susceptible of adjustment upon its axis without interfering with the rotary motion of said wheel and shaft, whether said wheel have a permanent inclination in combination with its adjustable obliquity or not, said wheel imparting a vibratory motion to a frame connected to rods, levers, or their mechanical equivalents for conveying motion.

What I claim as my invention and desire to secure as such by Letters Patent is—

1. The oblique wheel adjustable on an axis transverse to the revolving shaft.
2. Giving a permanent lead to the motion by a permanent inclination of the wheel A in combination with a variable inclination.
3. Conveying the vibratory motion to the rods by means of ball and socket or universal joints when said joints are used in combination with the frame.

S. LLOYD WIEGAND. [L. S.]

Witnesses:
 WM. THOMPSON,
 J. SNIDER.